(12) United States Patent
Li et al.

(10) Patent No.: US 8,625,713 B2
(45) Date of Patent: Jan. 7, 2014

(54) METHOD FOR BEAMFORMING TRANSMISSIONS FROM A NETWORK ELEMENT HAVING A PLURALITY OF ANTENNAS, AND THE NETWORK ELEMENT

(75) Inventors: Li Li, Edison, NJ (US); Thomas Marzetta, Summit, NJ (US)

(73) Assignee: Alcatel Lucent, Paris (FR)

(*) Notice: Subject to any disclaimer, the term of this patent is extended or adjusted under 35 U.S.C. 154(b) by 289 days.

(21) Appl. No.: 13/236,288

(22) Filed: Sep. 19, 2011

(65) Prior Publication Data

US 2013/0070827 A1    Mar. 21, 2013

(51) Int. Cl.
- *H04K 1/02* (2006.01)
- *H04L 25/03* (2006.01)
- *H04L 25/49* (2006.01)

(52) U.S. Cl.
USPC ........... 375/296; 375/299; 375/260; 375/346; 375/267; 375/231; 455/115.1; 455/115.2; 455/101; 370/252

(58) Field of Classification Search
USPC ......... 375/296, 299, 260, 346, 267, 232, 231; 455/115.1, 115.2, 101; 370/252; 342/377, 173
See application file for complete search history.

(56) References Cited

U.S. PATENT DOCUMENTS

| | | | |
|---|---|---|---|
| 8,145,138 B2* | 3/2012 | Chae et al. | 455/69 |
| 2006/0146725 A1* | 7/2006 | Li et al. | 370/252 |
| 2008/0192811 A1* | 8/2008 | Son | 375/219 |
| 2008/0267056 A1 | 10/2008 | Aryanfar et al. | |
| 2009/0093222 A1* | 4/2009 | Sarkar | 455/115.1 |
| 2009/0121935 A1* | 5/2009 | Xia et al. | 342/377 |
| 2009/0232245 A1* | 9/2009 | Lakkis | 375/267 |
| 2010/0026560 A1* | 2/2010 | Xia et al. | 342/173 |
| 2010/0067588 A1 | 3/2010 | Takano | |
| 2010/0093282 A1 | 4/2010 | Martikkala et al. | |
| 2010/0246494 A1* | 9/2010 | Sanayei | 370/328 |
| 2012/0213300 A1* | 8/2012 | Yamaura | 375/260 |
| 2012/0300864 A1* | 11/2012 | Merlin et al. | 375/260 |

FOREIGN PATENT DOCUMENTS

EP    1 708 385    10/2006

OTHER PUBLICATIONS

E. Aryafar, N. Anand, T. Salonidis, and E. Knightly. Design and experimental evaluation of multi-user beamforming in wireless lans. In *Proceedings of MobiCom*, 2010.
A. Bourdoux, B. Come, and N. Khaled. Non-reciprocal transceivers in ofdm/sdma systems: impact and mitigation. In *Radio and Wireless Conference*, 2003. RAWCON '03. Proceedings, pp. 183-186, Aug. 2003.
M. Guillaud, D. Slock, and R. Knopp. A practical method for wireless channel reciprocity exploitation through relative calibration. In *Signal Processing and Its Applications*, 2005. *Proceedings of the Eighth International Symposium on*, vol. 1, pp. 403-406, 28-31, 2005.
F. Kaltenberger, H. Jiang, M. Guillaud, and R. Knopp. Relative channel reciprocity calibration in mimo/tdd systems. In *Future Network and Mobile Summit*, 2010, pp. 1-10, Jun. 2010.
International Search Report and Written Opinion dated Jan. 2, 2013.

\* cited by examiner

*Primary Examiner* — Phuong Phu
(74) *Attorney, Agent, or Firm* — Harness, Dickey & Pierce

(57) ABSTRACT

In one embodiment, the method includes receiving a pilot signal from a terminal at a target antenna of the plurality of antennas of the network element, determining an uplink channel estimate for the target antenna based on the received pilot signal, and obtaining a calibration coefficient associated with the target antenna. The calibration coefficient is based on a channel estimate between the target antenna and a different one of the plurality of antennas. The method further includes beamforming a transmission to the terminal using at least the target antenna based on the determined uplink channel estimate and the obtained calibration coefficient.

15 Claims, 3 Drawing Sheets

Uplink channel $\hat{g}_{mk}$

Uplink pilot → $a'_k$ → $g_{mk}$ → $b_m$ →

Freq. responses:
tx chain of terminal k: $a'_k$
rx chain of BS antenna m: $b_m$
Over the air channel: $g_{mk}$ downlink channel $\hat{h}_{mk}$ Downlink data → $a_m$ → $g_{mk}$ → $b'_k$ →

Freq. responses:
tx chain of BS antenna m: $a_m$
rx chain of terminal k: $b'_k$
Over the air channel: $g_{mk}$

METHOD FOR BEAMFORMING TRANSMISSIONS FROM A NETWORK ELEMENT HAVING A PLURALITY OF ANTENNAS, AND THE NETWORK ELEMENT

BACKGROUND OF THE INVENTION

In wireless communication systems, base stations are traditionally equipped with a small number of antennas. A radically different approach involves base stations with an unprecedented numbers of antennas (M) simultaneously serving a much smaller number of mobile terminals (K where M>>K) using multi-user beamforming. Operating with a large ratio of antennas to terminals under simultaneous service can yield large increases in both spectral efficiency and energy efficiency. As the number of service antennas increases and power is reduced the most simple signal processing, conjugate beamforming on the forward link and matched-filtering on the reverse link, asymptotically achieves near-optimal performance. One technical challenge is rapid channel state estimation.

With M base station antennas and K terminals, a large antenna array (LSAS) base station deals with 2M×K channels. For each terminal, the base station can get all M uplink channels with one pilot transmission from the terminal. However, for the M downlink channels, the base station may have to send M pilots. In addition, the terminal will need to feed back the channel estimations to the base station. Accordingly, a total of (M+1)K pilot transmissions would be needed. Scaling is therefore a problem in this system.

SUMMARY OF THE INVENTION

At least one embodiment relates to a method of beamforming transmissions from a network element having a plurality of antennas.

In one embodiment, the method includes receiving a pilot signal from a terminal at a target antenna of the plurality of antennas of the network element, determining an uplink channel estimate for the target antenna based on the received pilot signal, and obtaining a calibration coefficient associated with the target antenna. The calibration coefficient is based on a channel estimate between the target antenna and a different one of the plurality of antennas. The method further includes beamforming a transmission to the terminal using at least the target antenna based on the determined uplink channel estimate and the obtained calibration coefficient.

In one embodiment, the obtaining obtains the calibration coefficient from a memory.

In one embodiment, the method further includes determining a first channel estimate for a channel from the target antenna to the different one of the plurality of antennas, determining a second channel estimate for a channel from the different one of the plurality of antennas to the target antenna, determining the calibration coefficient based on the first and second channel estimates, and storing the calibration coefficient in the memory.

In one embodiment, the method further includes determining first transmission and reception frequency responses associated with the target antenna, determining second transmission and reception frequency responses associated with the different one of the plurality of antennas, determining the calibration coefficient based on the first transmission and reception frequency responses and the second transmission and reception frequency responses, and storing the calibration coefficient in the memory.

In one embodiment, the obtaining includes determining a channel estimate between the target antenna and the different one of the plurality of antennas.

In another embodiment, the obtaining includes determining a transmission and reception frequency responses associated with the target antenna.

In one embodiment, the method further includes determining first transmission and reception frequency responses associated with the target antenna, determining second transmission and reception frequency responses associated with the different one of the plurality of antennas, determining the calibration coefficient based on the first transmission and reception frequency responses and the second transmission and reception frequency responses, and the obtaining obtains the determined calibration coefficient.

In another embodiment, the method further includes determining first transmission and reception frequency responses associated with the target antenna, determining second transmission and reception frequency responses associated with the different one of the plurality of antennas, determining the calibration coefficient based on the first transmission and reception frequency responses and the second transmission and reception frequency responses, and the obtaining obtains the determined calibration coefficient.

In one embodiment, the beamforming is conjugate beamforming.

In another embodiment, the beamforming is zero forcing beamforming.

In one embodiment, the beamforming increases received signal strength at the terminal coherently.

In another embodiment, the beamforming includes removing phase error in beamforming the transmission. For example, the beamforming may determine a calibration constant based on a frequency response of transmission and reception sides associated with the target antenna, and the beamforming removes the phase error based on the calibration coefficient.

In another embodiment of the method, the method includes receiving a pilot signal from a terminal at a plurality of antennas, determining an uplink channel estimate associated with each of the plurality of antennas based on the pilot signal received at the plurality of antennas, and beamforming transmissions from the plurality of antennas to the terminal based on the determined uplink channel estimate and a plurality of calibration coefficients. Each calibration coefficient is based on a channel estimate between a pair of the plurality of antennas.

At least one embodiment is related to a base station.

One embodiment of the base station includes a plurality of antennas, and a memory configured to store at least one calibration coefficient associated with a target one of the plurality of antennas. The calibration coefficient is based on a channel estimate between the target antenna and a different one of the plurality of antennas. The base station also includes a processor configured to determine an uplink channel estimate for the target antenna based on a pilot signal received at the target antenna from a terminal. The processor is configured to beamform a transmission to the terminal using at least the target antenna based on the determined uplink channel estimate and the stored calibration coefficient.

BRIEF DESCRIPTION OF THE DRAWINGS

The present invention will become more fully understood from the detailed description given herein below and the accompanying drawings, wherein like elements are represented by like reference numerals, which are given by way of illustration only, and thus, are not limiting of the present invention and wherein.

DETAILED DESCRIPTION OF THE EMBODIMENTS

Figure 1:
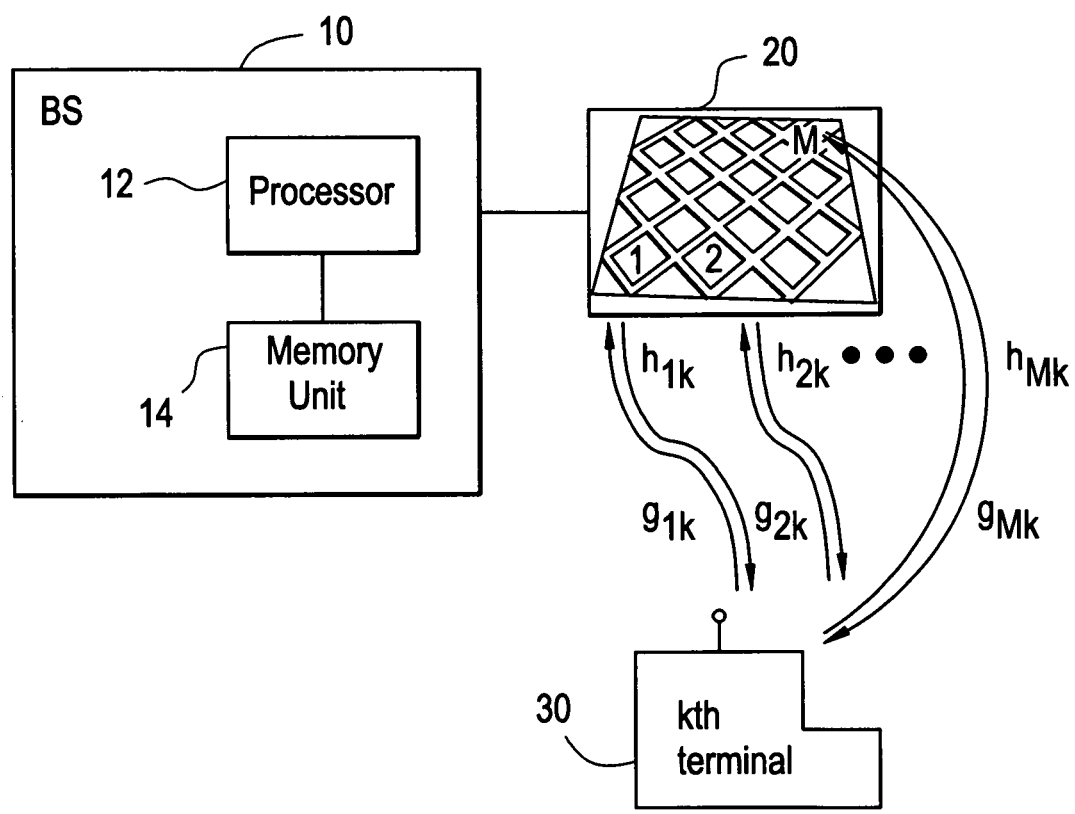
FIG. 1 illustrates a portion of a wireless communication system according to an embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the for in of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perforin the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "terminal" may be synonymous to a mobile user, mobile station, mobile terminal, user, subscriber, wireless terminal, user equipment and/or remote station and may describe a remote user of wireless resources in a wireless communication network. Accordingly, terminal may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

Communication from the base station to the terminal is typically called downlink or forward link communication. Communication from the terminal to the base station is typically called uplink or reverse link communication.

Architecture

FIG. 1 illustrates a portion of a wireless communication system according to an embodiment. As shown, a base station 10 has a large antenna array 20 of M antennas. For example, M may be 100 antennas, but is not limited to this number. The base station 10 also includes a processor 12 (e.g., a digital signal processor), and a memory unit 14. The memory unit 14 may be any well-known storage medium. The processor 12 controls operation and function of the base station 10, and stores data, etc. in the memory unit 14. The operation of the base station 10 will be described in greater detail below.

FIG. 1 also illustrates a terminal 30 in the coverage area of the base station 10. In this description it has been assumed that each terminal has one antenna for ease of description. However, the embodiments are not limited to terminals with a single antenna and the embodiments can be easily applied to terminals having more than one antenna. As will be appreciated, numerous terminals may be within the coverage area of the base station 10. As further shown in FIG. 1, $g_{mk}$ is over-the-air uplink channel between terminal 30, considered the kth terminal in this discussion, and base station antenna m (where m=1, . . . , M); and $h_{mk}$ is the over-the-air downlink channel from the antenna m to the terminal k. The uplink channel $g_{mk}$ is the same as the downlink channel $h_{mk}$ at any given time. As mentioned previously, with one pilot transmission from the terminal k, the base station 10 can estimate M uplink channels from the terminal k to the M antennas: $\hat{g}_{1k}, \ldots, \hat{g}_{Mk}$. Note that, $\hat{g}_{mk}$ includes the effect of transmission tx and reception rx chains at the base station 10 and the terminal k, which will be discussed next.

Figure 2:
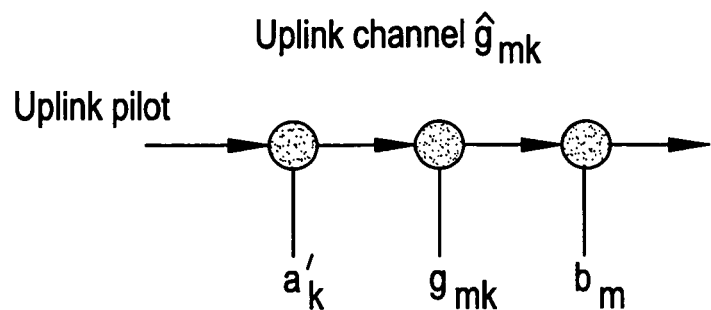
FIG. 2 graphically illustrates components forming the uplink channel accounted for in determining an uplink channel estimate.

To make use of channel reciprocity, the base station 10 accounts for the hardware differences in the transmitting and receiving chains. FIG. 2 shows the uplink channel $\hat{g}_{mk}$ accounting for the transmission tx chain of the terminal $a'_k$ and the reception rx chain $b_m$ of the base station antenna m where $a'_k$ and $b_m$ are the respective frequency responses. A prime has been used in the notation to signify variables associated with the terminal 30, and differentiate these from variables associated with the base station 10.

Figure 3:
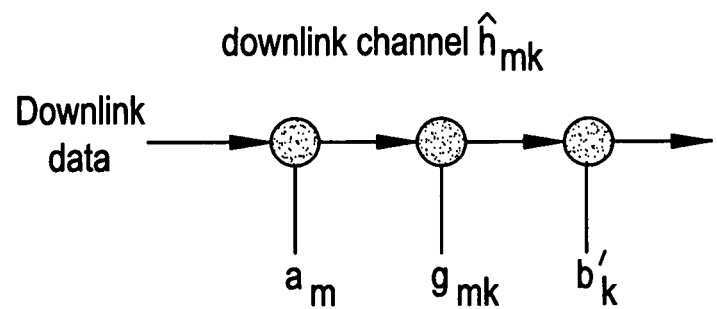
FIG. 3 graphically illustrates components forming the downlink channel accounted for in determining a downlink channel estimate.

FIG. 3 shows the downlink channel $\hat{h}_{mk}$ accounting for the transmission tx chain of the m-th base station antenna $a_m$ and the reception rx chain $b'_k$ of the terminal where $a_m$ and $b'_k$ are the respective frequency responses.

Theory

Next, the theory behind the operation of the base station 10 will be described, and this will be followed by a description of the operation of the base station 10.

Suppose we apply conjugate beamforming by multiplying the signal for transmission $s_k$ with the conjugate of the terminal's uplink channel to each respective base station antenna $\hat{g}^*_{mk}$. Conjugate beamforming assumes that the uplink channel estimate and the downlink channel estimate are the same, and therefore, the downlink channel effects may be removed by multiplying the signal for transmission $s_k$ with the conjugate of the terminal's uplink channel to each respective base station antenna $\hat{g}^*_{mk}$. According to this theory, we have the following:

$$y_k = \sum_{m=1}^{M} \hat{g}^*_{mk} \hat{h}_{mk} s_k + n_k \tag{1}$$

$$= \sum_{m=1}^{M} (b^*_m a_m)|g_{mk}|^2 (b'_k a'^*_k) s_k + n_k \tag{2}$$

where $y_k$ is the signal received at the terminal on the downlink and $n_k$ is noise. Because $b^*_m a_m$ are different for different antennas, we will not get coherent gains at the terminal. Example embodiments employ a calibration between antennas of the base station to obtain coherent gains as will be described below. Also, it will be appreciated that the above equations are for conjugate beamforming, and lack of coherent gain exists for other beamforming techniques such as zero-forcing beamforming, etc.

Operation

Figure 4:
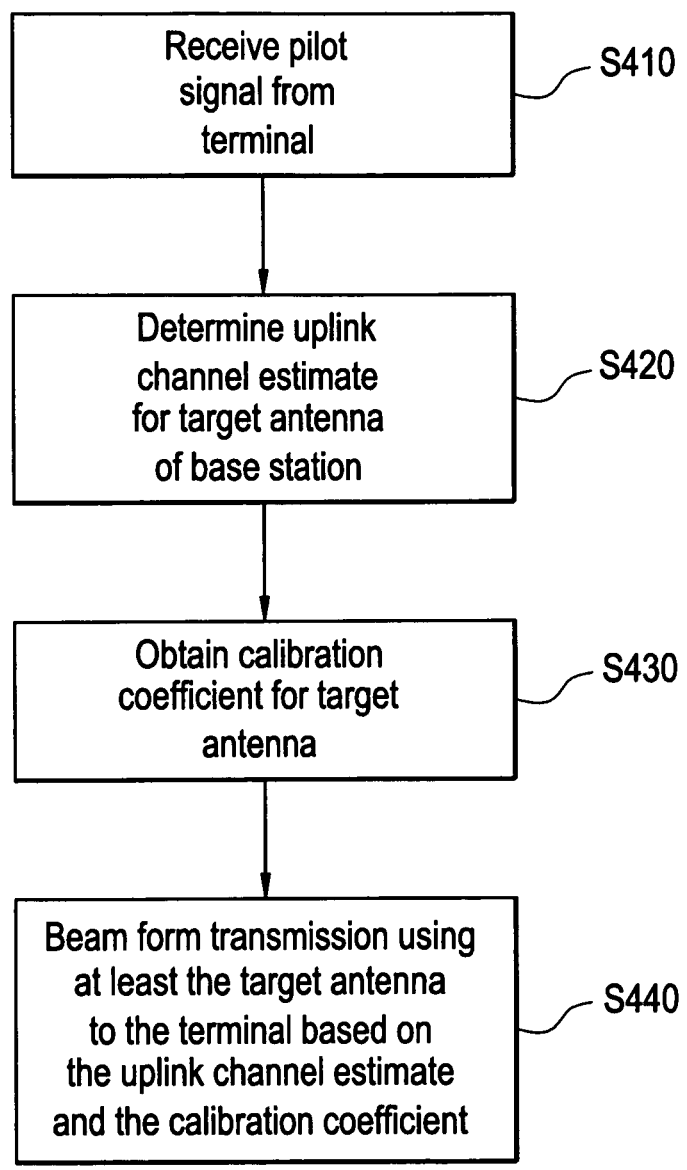
FIG. 4 illustrates a flow chart of a method for beamforming transmissions from a network element having a plurality of antennas according to an embodiment.

Next, operation of the base station 10 will be described in detail with respect to FIG. 4. FIG. 4 illustrates a flow chart of a method for beamforming transmissions from a network element having a plurality of antennas according to an embodiment. As alluded to, the method will be described with respect to the architecture of FIG. 1, but it will be appreciated that the method is not limited to this architecture.

As shown, in step S410, the base station 10 receives a pilot signal from a kth terminal 30 at the M antenna array 20. Based on the pilot signal received at any antenna m in the array, the base station 20, and more particularly, the processor 12 determines the uplink channel estimate $\hat{g}^*_{mk}$ in step S420. Namely, the base station 20 may determine M uplink channel estimates, each between the k-th terminal and one of the M antennas in the antenna array 20. However, for simplicity of description, the method will be described with respect to one of the M antennas of the base station referred to as the mth antenna or the target antenna. Any well-known method for determining a channel estimate may be used. The determined uplink channel estimates may be stored in the memory unit 10.

Next, the processor 12 obtains a calibration coefficient for the target antenna in step S430. The calibration coefficient is based on a channel estimates for uplink and downlink channels between the target antenna and another of the M antennas in the array 20.

In one embodiment, the base station 10 determines the calibration coefficient or a plurality of calibration coefficients, and then stores the calibration coefficients in the memory unit 14 for use during the method of FIG. 4. In another embodiment, the calibration coefficient may be determined as part of the obtaining step S430.

The base station 10 may determines the calibration coefficient by establishing one or more reference antennas in the array 20. For example, assuming base station antenna 1 is established as a reference antenna, then for each antenna m>1, the forward and reverse channels are denoted as $G_{m1}$ and $H_{m1}$, respectively. Any method of channel estimation may be used. For example, $G_{m1}$ and $H_{m1}$ can be obtained by sending pilots for RF chain calibration. Then, the calibration coefficient $C_{m1}$ is determined according to expression (3) below:

$$C_{m1} = \frac{H_{m1}}{G_{m1}} = \frac{C_m}{C_1} = \frac{b_m}{a_m}\frac{a_1}{b_1} \quad (3)$$

where $$C_m = \frac{b_m}{a_m} \text{ and } C_1 = \frac{b_1}{a_1}.$$

Alternatively, $C_m$ and $C_1$ could be individually estimated according to any well-known manner, and then multiplied to determine $C_{m1}$. As a further alternative, $a_1$, $b_1$, $a_m$ and $b_m$ could be separately estimated according to any well-known manner, and then used according to equation (3) to determine $C_{m1}$. Namely, instead of an RF based method of channel estimation, a hardware based or other alternative method may be used.

As alluded to above, instead of using antenna 1 or only antenna 1 as the reference antenna, a different reference antenna or more than one reference antenna may be used. For example, sets of calibration coefficients may be determined, where each set has a different reference antenna. Each set may also have different sub-sets of the M antennas for which calibration coefficients are determined.

The base station 10 performs beamforming of transmissions on the downlink using the target antenna m to the terminal 30 based on the determined uplink channel estimate for the target antenna, and the calibration coefficient for the target antenna in step S440. As will be appreciated beamforming generally involves a number of antennas, one of which will be the target antenna. Returning to our example of conjugate beamforming, instead of multiplying $\hat{g}^*_{mk}$ for conjugate beamforming, we multiply the signal for transmission $s_k$ by $C_{m1}\hat{g}^*_{mk}$ or $C_m\hat{g}^*_{mk}$ and transmit. If we use the former, equation (1) becomes, assuming antenna 1 of the antenna array 20 is the reference antenna:

$$y_k = \sum_{m=1}^{M} C_{m1}\hat{g}^*_{mk}\hat{h}_{mk}s_k + n_k \quad (4)$$

$$= \sum_{m=1}^{M} |b_m|^2|g_{mk}|^2\left(\frac{a_1}{b_1}b'_k a_k^{*'}\right)s_k + n_k \quad (5)$$

From equation (4), we see that all M signals will coherently add.

While beamforming based on calibration coefficients was explained with respect to conjugate beamforming, use of calibration coefficients is equally application in any type of beamforming, such as zero forcing, etc.

Furthermore, while the description above was with respect to a target antenna of the antenna array 20, it will be appreciated that the method of FIG. 4 may be applied more than one antenna in the antenna array 20 simultaneously.

Phase Error

As shown by equation (4), a constant phase rotation term $$\left(\frac{a_1}{b_1}b'_k a_k^{*'}\right)$$

may exist. There are at least two ways of dealing with this.

According to one embodiment, a phase correction pilot for each data transmission may be added to correct any phase error. In practice, however, this is often not needed. For example, in 802.11 or LIE wireless standards, typically there are phase correction pilots in the data transmission. These pilots effect correction of this residual phase error.

If there is no phase correction pilot in transmitted data symbols, we can use a further calibration approach to remove the phase error $$\left(\frac{a_1}{b_1}b'_k a_k^{*'}\right)$$

in equation (4). In this approach, the channel between a reference antenna of the base station, e.g., antenna 1, and terminal k is calibrated. Here, the base station 10 determines a calibration constant as $$D_{1k} = \frac{b_1}{a_1}\frac{a'_k}{b'_k}.$$

As discussed above, $a_1$, $b_1$, $a'_k$ and $b'_k$ may be individually determined according to any well-known method, and then $D_{1k}$ determined there from. Instead of multiplying $C_{m1}\hat{g}^*_{mk}$ for conjugate beamforming, we multiply the signal for transmission $s_k$ by $D_{1k}C_{m1}\hat{g}^*_{mk}$. Note that, $$D_{mk} = D_{1k}C_{m1} \quad (6)$$

Equation (6) represents indirect channel calibration. In other words, once the base station antennas have been calibrated relative to a reference base station antenna, and the channel between the reference base station antenna and the terminal is calibrated, the base station 10 may calibrate the channel between any base station antenna and the terminal using equation (6).

Using the indirect calibration, conjugate beamforming becomes:

$$y_k = \sum_{m=1}^{M} D_{1k} C_{m1} \hat{g}_{mk}^* \hat{h}_{mk} s_k + n_k \quad (7)$$

$$= \sum_{m=1}^{M} |b_m|^2 |g_{mk}|^2 |a_k|^2 s_k + n_k \quad (8)$$

As will be appreciated, the beamforming according to example embodiments is fully scalable, and does not require feed back from the terminal.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A method of beamforming transmissions from a network element having a plurality of antennas, comprising:
   receiving a pilot signal from a terminal at a target antenna of the plurality of antennas of the network element;
   determining an uplink channel estimate for the target antenna based on the received pilot signal;
   obtaining a calibration coefficient associated with the target antenna, the calibration coefficient based on a channel estimate between the target antenna and a different one of the plurality of antennas; and
   beamforming a transmission to the terminal using at least the target antenna based on the determined uplink channel estimate and the obtained calibration coefficient.

2. The method of claim 1, wherein the obtaining obtains the calibration coefficient from a memory.

3. The method of claim 2, further comprising:
   determining a first channel estimate for a channel from the target antenna to the different one of the plurality of antennas;
   determining a second channel estimate for a channel from the different one of the plurality of antennas to the target antenna;
   determining the calibration coefficient based on the first and second coefficients; and
   storing the calibration coefficient in the memory.

4. The method of claim 2, further comprising:
   determining first transmission and reception frequency responses associated with the target antenna;
   determining second transmission and reception frequency responses associated with the different one of the plurality of antennas;
   determining the calibration coefficient based on the first transmission and reception frequency responses and the second transmission and reception frequency responses; and
   storing the calibration coefficient in the memory.

5. The method of claim 2, wherein the obtaining includes determining a channel estimate between the target antenna and the different one of the plurality of antennas.

6. The method of claim 2, wherein the obtaining includes determining a transmission and reception frequency responses associated with the target antenna.

7. The method of claim 1, further comprising:
   determining first transmission and reception frequency responses associated with the target antenna;
   determining second transmission and reception frequency responses associated with the different one of the plurality of antennas;
   determining the calibration coefficient based on the first transmission and reception frequency responses and the second transmission and reception frequency responses; and
   the obtaining obtains the determined calibration coefficient.

8. The method of claim 1, further comprising:
   determining first transmission and reception frequency responses associated with the target antenna;
   determining second transmission and reception frequency responses associated with the different one of the plurality of antennas;
   determining the calibration coefficient based on the first transmission and reception frequency responses and the second transmission and reception frequency responses; and
   the obtaining obtains the determined calibration coefficient.

9. The method of claim 1, wherein the beamforming is conjugate beamforming.

10. The method of claim 1, wherein the beamforming is zero forcing beamforming.

11. The method of claim 1, beamform wherein the beamforming increase received signal strength at the terminal coherently.

12. The method of claim 1, wherein the beamforming includes removing phase error in beamforming the transmission.

13. The method of claim 12, wherein the beamforming determines a calibration constant based on a frequency response of transmission and reception sides associated with the target antenna, and the beamforming removes the phase error based on the calibration coefficient.

14. A method of beamforming transmissions from a network element having a plurality of antennas, comprising:
   receiving a pilot signal from a terminal at a plurality of antennas;
   determining an uplink channel estimate associated with each of the plurality of antennas based on the pilot signal received at the plurality of antennas;
   beamforming transmissions from the plurality of antennas to the terminal based on the determined uplink channel estimate and a plurality of calibration coefficients, each calibration coefficient based on a channel estimate between a pair of the plurality of antennas.

15. A base station, comprising:
   a plurality of antennas;
   a memory configured to store at least one calibration coefficient associated with a target one of the plurality of antennas, the calibration coefficient based on a channel estimate between the target antenna and a different one of the plurality of antennas;
   a processor configured to determine an uplink channel estimate for the target antenna based on a pilot signal received at the target antenna from a terminal, and configured to beamform a transmission to the terminal using at least the target antenna based on the determined uplink channel estimate and the stored calibration coefficient.

* * * * *